United States Patent
Degand et al.

(10) Patent No.: US 11,260,757 B2
(45) Date of Patent: Mar. 1, 2022

(54) METHOD FOR ASSISTANCE OF A DRIVING MANEUVER, AND ASSISTANCE SYSTEM FOR A DRIVING MANEUVER

(71) Applicant: Bayerische Motoren Werke Aktiengesellschaft, Munich (DE)

(72) Inventors: Christoph Degand, Munich (DE); Pablo Fritzsche, Herrsching (DE); Alexander Kowallik, Munich (DE); Boris Zuev, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 286 days.

(21) Appl. No.: 16/655,049

(22) Filed: Oct. 16, 2019

(65) Prior Publication Data

US 2020/0047628 A1 Feb. 13, 2020

Related U.S. Application Data

(63) Continuation of application No. PCT/EP2018/059143, filed on Apr. 10, 2018.

(30) Foreign Application Priority Data

Apr. 20, 2017 (DE) ...................... 10 2017 206 694.6

(51) Int. Cl.
*B60L 15/20* (2006.01)
*B60L 58/12* (2019.01)

(52) U.S. Cl.
CPC ............ *B60L 15/209* (2013.01); *B60L 58/12* (2019.02); *B60L 2240/42* (2013.01); *B60L 2240/54* (2013.01); *B60L 2250/16* (2013.01)

(58) Field of Classification Search
CPC .... B60L 15/209; B60L 58/12; B60L 2240/42; B60L 2240/54; B60L 2250/16;
(Continued)

(56) References Cited

U.S. PATENT DOCUMENTS

| 9,483,947 | B2 | 11/2016 | Berger |
| 9,493,071 | B2 | 11/2016 | Lindhuber et al. |

(Continued)

FOREIGN PATENT DOCUMENTS

| DE | 40 05 444 A1 | 8/1991 |
| DE | 197 25 656 A1 | 1/1998 |

(Continued)

OTHER PUBLICATIONS

PCT/EP2018/059143, International Search Report dated Jul. 6, 2018 (Two (2) pages).

(Continued)

*Primary Examiner* — Richard M Camby
(74) *Attorney, Agent, or Firm* — Crowell & Moring LLP (57) ABSTRACT

A method for assisting a power-intensive driving maneuver of an ego vehicle propelled by an electric motor fed from an energy-storage device includes predicting a power-intensive driving maneuver of the ego vehicle, ascertaining a peak-power profile that is needed for a complete execution of the predicted driving maneuver, and determining an available propulsive power of the ego vehicle. The method further includes ascertaining whether the available propulsive power is sufficient for the peak-power profile and, if the available propulsive power is sufficient for the peak-power profile, indicating a recommendation for execution of the predicted driving maneuver. If the available power is not sufficient for the peak-power profile, the method further includes ascertaining whether the available propulsive power is sufficient for a restricted peak-power profile that is needed for a restricted execution of the predicted driving maneuver, indicating a recommendation for restricted execution of the predicted driving maneuver if the available propulsive power is sufficient for the restricted peak-power profile, and indicating a recommendation for non-execution (Continued)

of the predicted driving maneuver if the available propulsive power is not sufficient for the restricted peak-power profile.

19 Claims, 4 Drawing Sheets

(58) Field of Classification Search
 CPC .. B60L 58/10; B60L 2260/54; B60L 2260/16; B60W 2556/10; B60W 2510/246; B60W 2510/244; B60W 50/0097; B60W 50/14; Y02T 10/64; Y02T 10/70; Y02T 10/72
 See application file for complete search history.

(56) References Cited

U.S. PATENT DOCUMENTS 10,457,277 B2 * 10/2019 Bonarens ............ B60W 30/095
2016/0107644 A1 * 4/2016 Eigel ................... B60W 30/146
 701/70
2017/0327110 A1 * 11/2017 Inoue .................. B60W 30/095

FOREIGN PATENT DOCUMENTS

| DE | 10 2007 054 453 A1 | 5/2009 |
| DE | 10 2010 041 544 A1 | 3/2012 |
| DE | 10 2011 119 378 A1 | 5/2013 |
| DE | 10 2013 217 434 A1 | 3/2015 |
| DE | 10 2014 211 530 A1 | 12/2015 |
| EP | 0 443 185 A2 | 8/1991 |
| EP | 2 535 221 A1 | 12/2012 |

OTHER PUBLICATIONS

German Search Report issued in German counterpart application No. 10 2017 206 694.6 dated Jan. 22, 2018, with Statement of Relevancy (Six (6) pages).

* cited by examiner

METHOD FOR ASSISTANCE OF A DRIVING MANEUVER, AND ASSISTANCE SYSTEM FOR A DRIVING MANEUVER

CROSS REFERENCE TO RELATED APPLICATIONS

This application is a continuation of PCT International Application No. PCT/EP2018/059143, filed Apr. 10, 2018, which claims priority under 35 U.S.C. § 119 from German Patent Application No. 10 2017 206 694.6, filed Apr. 20, 2017, the entire disclosures of which are herein expressly incorporated by reference.

BACKGROUND AND SUMMARY OF THE INVENTION

The invention relates to a method for assisting a driving maneuver of an ego vehicle propelled by an electric motor fed from an energy-storage device, and to an assistance system for a driving maneuver of an ego vehicle propelled by an electric motor fed from an energy-storage device.

Driving-maneuver assistants, such as an overtaking assistant which, for instance, is described in DE 10 2014 211 530 A1 or in DE 10 2013 217 434 A1, or a lane-change assistant which, for instance, is described in DE 40 05 444 A1, are already known from the state of the art. Furthermore, a driver-assistance system is known that assists the driver in the course of consumption-controlled driving, as described, for instance, in DE 10 2010 041 544 A1.

However, the assistance systems known from the state of the art give the driver no support in order to assess whether sufficient propulsive power of the vehicle is available for the planned driving maneuver. Especially in electrically operated vehicles, this aspect is essential, because the consequence of an inadequate energy supply is usually a restriction of the propulsive power. In the course of power-intensive driving maneuvers, however, it is important to provide sufficient propulsive power over the entire duration of the power-intensive driving maneuver.

It is therefore an object of the invention to provide a method for assisting a power-intensive driving maneuver of an ego vehicle propelled by an electric motor fed from an energy-storage device, said method providing information about the availability of propulsive power over the duration of the power-intensive driving maneuver.

The object is achieved by the features of the independent claims. Advantageous embodiments are described in the dependent claims. It should be pointed out that additional features of a claim that is dependent on an independent claim but without the features of the independent claim, or only in combination with a subset of the features of the independent claim, may constitute a separate invention which is independent of the combination of all the features of the independent claim and which may be made the subject of an independent claim, of a divisional application or of a subsequent application. This applies in like manner to technical teachings described in the description, which may constitute an invention that is independent of the features of the independent claims.

A first aspect of the invention relates to a method for assisting a power-intensive driving maneuver of an ego vehicle propelled by an electric motor fed from an energy-storage device, said method comprising:

predicting a power-intensive driving maneuver of the ego vehicle;

ascertaining a peak-power profile that is needed for the complete execution of the predicted driving maneuver;

determining the available propulsive power of the ego vehicle;

ascertaining whether the available propulsive power is sufficient for the peak-power profile; and carrying out one of the following actions a) and b):

a) indicating a recommendation for execution of the predicted driving maneuver if the available propulsive power is sufficient for the peak-power profile;

b) if the available propulsive power is not sufficient for the peak-power profile:

ascertaining whether the available propulsive power is sufficient for a restricted peak-power profile that is needed for a restricted execution of the predicted driving maneuver; and indicating a recommendation for restricted execution of the predicted driving maneuver in the case where the available propulsive power is sufficient for the restricted peak-power profile; or indicating a recommendation for non-execution of the predicted driving maneuver in the case where the available propulsive power is not sufficient for the restricted peak-power profile.

Within the context of these remarks, by a "power-intensive driving maneuver of the ego vehicle" a driving maneuver is understood in which a high propulsive power or the maximum propulsive power is necessary for a defined period. Such a driving maneuver comprises at least one of the following procedures: an overtaking procedure, a change of lane, an entrance or exit—for instance a freeway entrance or freeway exit, an acceleration procedure and a boost procedure. The previously described procedures may be combined arbitrarily in order to constitute a power-intensive driving maneuver. In this regard, only one of these procedures may also be the power-intensive driving maneuver.

A power-intensive driving maneuver of the ego vehicle is predicted, according to one embodiment, with the aid of at least one of the following: environment recognition, pedal parameters—such as, for example, information about the pedal travel—steering data—such as, for example, information about the steering movement—and data pertaining to a driving-direction indicator, such as, for example, the activation of the turn-signal. The environment recognition is designed to recognize the environment of the vehicle with the aid of environmental sensorics, and to make available and/or process corresponding environmental data. The environmental sensorics comprise at least one of the following devices: ultrasound sensor, radar sensor, lidar sensor and/or camera. The environmental data may originate from one of the aforementioned devices or from a combination of several of the aforementioned devices (sensor-data fusion). The predicting of a power-intensive driving maneuver of the ego vehicle is accordingly carried out by detection and evaluation of environmental data and/or pedal parameters and/or steering data and/or data pertaining to a driving-direction indicator.

According to one embodiment, the power-intensive driving maneuver comprises at least one overtaking procedure. An overtaking procedure is detectable by at least one of the following actions, which by the aforementioned data or devices, such as, for example, the environment recognition:

closing-up of the ego vehicle on a vehicle traveling ahead. Already the approach to a vehicle traveling ahead can be recognized as a recognition criterion for an intent to overtake;

establishing an applicable differential speed which has to obtain for the closing-up of the vehicle;

following by the ego vehicle of a vehicle traveling ahead, and activating of a direction-change indication (for example, turn-signal);

following by the ego vehicle of a vehicle traveling ahead, and rapid depressing of the accelerator pedal; and steering movement(s) and offset following—that is to say, swinging-out and/or offset driving—of a vehicle traveling ahead.

Within the context of the present document, by an "energy-storage device" a system is to be understood that comprises one or more energy-storage units connected in series and/or in parallel, which each exhibit at least two energy-storage cells. A preferred example of such an energy-storage device is an accumulator or a high-voltage battery, such as are conventionally used in electric or hybrid vehicles.

For the ascertainment of a peak-power profile—that is to say, a temporal progression of the peak power—advantageously the temporal and spatial sequence of the power-intensive driving maneuver is firstly predicted. In this connection the focus is directed toward the peak power to be solicited. For the prediction of the temporal and spatial sequence of the power-intensive driving maneuver, driving-dynamics data pertaining to at least one of the following are ascertained and evaluated: the ego vehicle, a vehicle traveling ahead, a following vehicle and an oncoming vehicle. The driving-dynamics data comprise at least one of the following items of information: route, distance, time, speed, acceleration, spacing from a vehicle traveling ahead and/or from a following vehicle and/or from an oncoming vehicle, expenditure of energy, heating of the motor or motors, propulsive forces, power, kinetic resistance, and vehicle efficiency.

In the sense of the present remarks, the term "peak-power profile" encompasses the profile of the maximum propulsive power. By the "maximum propulsive power", the propulsive power is to be understood that can be made available by the propulsion system for a short loading period without the power of the electric propulsion system breaking down.

According to one embodiment, the ascertainment of the peak-power profile comprises the ascertaining of the period that is needed for the complete execution of the predicted driving maneuver and the ascertaining of the temporal progression of the propulsive power over the predicted period.

According to another embodiment, the ascertainment of the peak-power profile comprises the ascertaining of the period that is needed for the complete execution of the predicted driving maneuver and the ascertaining of the temporal progression of the maximum propulsive power over the predicted period. This accordingly means that the focus is directed toward peak powers of the electric propulsion system. An electric propulsion system comprises at least one energy-storage device, an energy-regulator (converter) and at least one traction-regulating unit. Ordinarily, electric propulsion systems are designed for their continuous load. However, in this case a peak load of the electric propulsion system which is possible for a short time is disregarded. Electric propulsion systems can be operated with brief peak load which lies distinctly above the continuous power output.

However, by reason of higher thermal and mechanical loading as well as diverse damage mechanisms, this peak load may obtain only to a temporally limited extent, whereas the continuous load is permanently available. Ordinarily, the operating strategy of the electric propulsion system is accordingly chosen in such a way that the available propulsive torque is limited in a manner depending on the time-limits set by the respectively available peak load or continuous load. A limitation of the available propulsive torque can result in a reduction of driving performance during the implementation of a power-intensive overtaking maneuver, and is therefore highly relevant to safety. By virtue of the early determination of the peak-power profile and of the available propulsive power, in particular of the available maximum propulsive power, it is possible to guarantee a safe trip for the driver and for the occupants of the vehicle, even for a power-intensive driving maneuver.

According to one embodiment, the propulsive power or maximum propulsive power includes at least the electrical power or maximum electrical power of the energy-storage device and the power or maximum power of the electric motor. In addition, the propulsive power or maximum propulsive power may additionally include the power or maximum power of an inverter of the electric propulsion system.

According to the first aspect of the present invention, the available propulsive power of the ego vehicle is determined. Preferably, the available maximum propulsive power—in other words, the peak power—of the ego vehicle is determined. In other words, a (power) forecast is carried out which ascertains the maximum propulsive power that is available for a defined time-interval; in this connection, the defined time-interval may be equal to the predicted period of time for the power-intensive driving maneuver.

According to another embodiment, the determination of the available propulsive power or of the maximum propulsive power is carried out by at least one of the following actions being executed:

ascertaining the state of charge of the energy-storage device;

ascertaining the thermal state of the energy-storage device;

ascertaining the power-consumption history over a certain time-interval; and ascertaining an operating limit of the electric motor.

In other words, a forecast of the available propulsive power or available maximum propulsive power is carried out, in the course of which the available power or available maximum power, optionally also the operating limit, of the electric propulsion system—that is to say, at least of the electric motor and of the energy-storage device—are taken into consideration. The available electrical power of the energy-storage device is, for instance, ascertained by the current state of charge of the energy-storage device, the thermal state of the individual energy-storage modules—for example, cell temperatures and module temperatures—and also the history of the power consumption over a defined time-interval being considered.

According to another embodiment, the determination of the available propulsive power comprises the determination of the available propulsive power for the complete execution of the predicted driving maneuver and the determination of the available propulsive power after complete execution of the predicted driving maneuver.

In other words, both a forecast of the available propulsive power or of the maximum propulsive power for the period that is needed for the complete execution of the predicted driving maneuver and a consequential forecast of the available propulsive power or of the maximum propulsive power for the time-interval after complete execution of the predicted driving maneuver are carried out. That is to say, the capacity of the electric propulsion system is accordingly ascertained that is still available when the propulsive power needed for the complete execution of the predicted driving maneuver has been solicited.

For the determination of the available propulsive power or of the maximum available propulsive power after complete execution of the predicted driving maneuver, the propulsive power or maximum propulsive power needed for the predicted driving maneuver and optionally the history of the power consumption over a past defined time-interval and/or the current operating state of the electric propulsion system are drawn upon.

According to the first aspect of the present invention, it is then ascertained whether the available propulsive power or available maximum propulsive power is sufficient for the peak-power profile. For this purpose, the available propulsive power or available maximum propulsive power determined by the forecast or by the forecast and the consequential forecast is compared with the ascertained temporal progression of the propulsive power over the predicted period.

According to another embodiment, if the duration of the predicted driving maneuver and/or the temporal progression of the propulsive power over the predicted period cannot be ascertained, a replacement value for the duration of the predicted driving maneuver and/or the level of the available propulsive power or of the available maximum propulsive power, and/or for the temporal progression of the propulsive power or of the available maximum propulsive power, is ascertained.

According to the first aspect of the present invention, one of the following actions a) and b) is then carried out:

a) indicating a recommendation for execution of the predicted driving maneuver if the available propulsive power or available maximum propulsive power is sufficient for the peak-power profile;

b) if the available propulsive power or available maximum propulsive power is not sufficient for the peak-power profile:

ascertaining whether the available propulsive power or available maximum propulsive power is sufficient for a restricted peak-power profile that is needed for a restricted execution of the predicted driving maneuver; and indicating a recommendation for restricted execution of the predicted driving maneuver in the case where the available propulsive power or available maximum propulsive power is sufficient for the restricted sufficient peak-power profile; or indicating a recommendation for non-execution of the predicted driving maneuver in the case where the available propulsive power or available maximum propulsive power is not sufficient for the restricted peak-power profile.

The ascertaining of whether the available propulsive power or available maximum propulsive power is sufficient for a restricted peak-power profile that is needed for a restricted execution of the predicted driving maneuver advantageously comprises several steps: firstly, a driving maneuver is ascertained that is similar to the predicted driving maneuver. For example, a driving maneuver is ascertained that leads to the same destination but is executed in a different way. If the predicted driving maneuver is, for instance, an overtaking maneuver that is executed at 120 km/h, a restricted execution of the predicted driving maneuver would be an overtaking maneuver that is executed at 100 km/h. After a possibility for a restricted execution of the predicted driving maneuver has been ascertained, the peak-power profile for the restricted execution of the predicted driving maneuver is ascertained.

Alternatively, the ascertaining of whether the available propulsive power or available maximum propulsive power is sufficient for a restricted peak-power profile that is needed for a restricted execution of the predicted driving maneuver comprises the ascertaining of at least one of the following parameters which depend on the available propulsive power or on the available maximum propulsive power: maximum speed, up to which the propulsive power or maximum propulsive power is available without drop in power, maximum engine speed, up to which the propulsive power or maximum propulsive power is available without drop in power, and maximum torque, up to which the propulsive power or maximum propulsive power is available without drop in power. The aforementioned parameters can optionally be linked with the period for which the respective parameter is available without drop in power.

The indicating described under the actions a) and b) is executed by an indicating device. The indicating device comprises an acoustic indication and/or a visual indication and/or a haptic indication.

For instance, the recommendation for execution of the predicted driving maneuver or the recommendation for restricted execution of the predicted driving maneuver is expressed by lighting-up or flashing of a certain color, for example the color green or yellow.

The indicating device preferably comprises a visual indication in the form of a display. The indicating of the recommendation for execution of the predicted driving maneuver is then undertaken, for instance, via the indicating of a message on the display.

According to one embodiment, the indicating of a recommendation for restricted execution of the predicted driving maneuver includes the indicating of a forecast temporal progression of the propulsive power. For example, on the basis of the determination of the available propulsive power or of the available maximum propulsive power it is indicated on a speed indication (for example, speedometer) from which speed a drop in the propulsive power or in the maximum propulsive power has to be reckoned with, and/or it is indicated on an indication of the engine speed from which engine speed a drop in the propulsive power or in the maximum propulsive power has to be reckoned with.

The method advantageously includes the indicating of the forecast duration of the predicted driving maneuver or of the restricted predicted driving maneuver (restricted execution of the predicted driving maneuver). The indication may be visual, haptic and/or acoustic.

Some steps of the method are advantageously carried out again during the execution of the power-intensive driving maneuver. As a result, individual steps of the method can be altered in the course of the implementation of the power-intensive driving maneuver. Advantageously, during the power-intensive driving maneuver a peak-power profile that is needed for the remaining execution of the predicted driving maneuver is ascertained continuously. Similarly, the (currently) available propulsive power or (current) available maximum propulsive power of the ego vehicle is determined continuously, and it is ascertained continuously whether the available propulsive power or available maximum propulsive power is sufficient for the peak-power profile while the power-intensive driving maneuver is being executed. After each determination of the available propulsive power and the ascertainment of whether this power is sufficient, one of the actions a) and b) is carried out. Therefore during the execution of the power-intensive driving maneuver it may happen, for instance, that an originally indicated recommendation for execution of the predicted driving maneuver is updated by a recommendation for non-execution of the predicted driving maneuver. In other words, a prompt for abortion of the power-intensive driving maneuver is indicated.

The method, described above, for assisting a power-intensive driving maneuver may be part of an automated driving maneuver. By the term "automated driving" or "automated driving maneuver", driving with automated longitudinal or transverse guidance, or autonomous driving with automated longitudinal and transverse guidance, may be understood. The term "automated driving" encompasses automated driving with an arbitrary degree of automation, in particular assisted, partially automated, highly automated, fully automated or driverless driving. In the case of assisted driving, the driver executes the longitudinal or transverse guidance permanently while the system undertakes the respective other function. In the case of partially automated driving, the system undertakes the longitudinal and transverse guidance, in which connection the driver has to monitor the system permanently. In the case of highly automated driving, the system undertakes the longitudinal and transverse guidance without the driver having to monitor the system permanently; but the driver has to be capable of taking over the guidance of the vehicle within a certain time. In the case of fully automated driving, the system can manage the driving in all situations automatically for a specific application; no driver is required for this application. In the case of driverless driving, the system can manage all situations automatically during the entire trip; a driver is generally no longer required.

If the method, described above, for assisting a power-intensive driving maneuver is part of an automated driving maneuver, the method serves mainly to give the occupants of the ego vehicle a feedback concerning the driving procedures proceeding in automated manner. But the method can also be utilized to give the driver of the ego vehicle the option to control the selection of a certain power-intensive driving maneuver or, by reason of the information that is indicated to him/her, to intervene actively in the implementation of the power-intensive driving maneuver.

A second aspect of the invention relates to an assistance system for a power-intensive driving maneuver of an ego vehicle propelled by an electric motor fed from an energy-storage device, which system comprises:

a detection unit for predicting a power-intensive driving maneuver of the ego vehicle;
a control unit coupled with the detection unit and with the energy-storage device; and
an indicating device coupled with the control unit;
wherein the control unit is designed:
to ascertain a peak-power profile that is needed for the complete execution of the predicted driving maneuver;
to determine the available propulsive power of the ego vehicle;
to ascertain whether the available propulsive power is sufficient for the peak-power profile; and
if the available propulsive power is not sufficient for the peak-power profile, to ascertain whether the available propulsive power is sufficient for a restricted peak-power profile that is needed for a restricted execution of the predicted driving maneuver;
and wherein the indicating device is designed to carry out one of the following actions a) and b):

a) indicating a recommendation for execution of the predicted driving maneuver if the available propulsive power is sufficient for the peak-power profile;
b) if the available propulsive power is not sufficient for the peak-power profile: indicating a recommendation for restricted execution of the predicted driving maneuver in the case where the available propulsive power is sufficient for the restricted peak-power profile; or indicating a recommendation for non-execution of the predicted driving maneuver in the case where the available propulsive power is not sufficient for the restricted peak-power profile.

The above remarks relating to the method according to the invention as defined by the first aspect of the invention also apply, in corresponding manner, to the assistance apparatus according to the invention as defined by the second aspect of the invention; advantageous examples of embodiments of the apparatus according to the invention correspond to the described advantageous examples of embodiments of the method according to the invention. At this point, advantageous examples of embodiments of the assistance apparatus according to the invention that have not been described explicitly correspond to the described advantageous examples of embodiments of the method according to the invention.

For the assessment of the safety of a planned, power-intensive driving maneuver, the described method for assisting a power-intensive driving maneuver, or the assistance system for a power-intensive driving maneuver, constitutes a suitable interface for the driver in order make sure that no restriction of the level of propulsive power is to be expected for the power-intensive driving maneuver.

The invention will be described in the following on the basis of embodiment examples with the aid of the appended drawings. Shown therein are:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
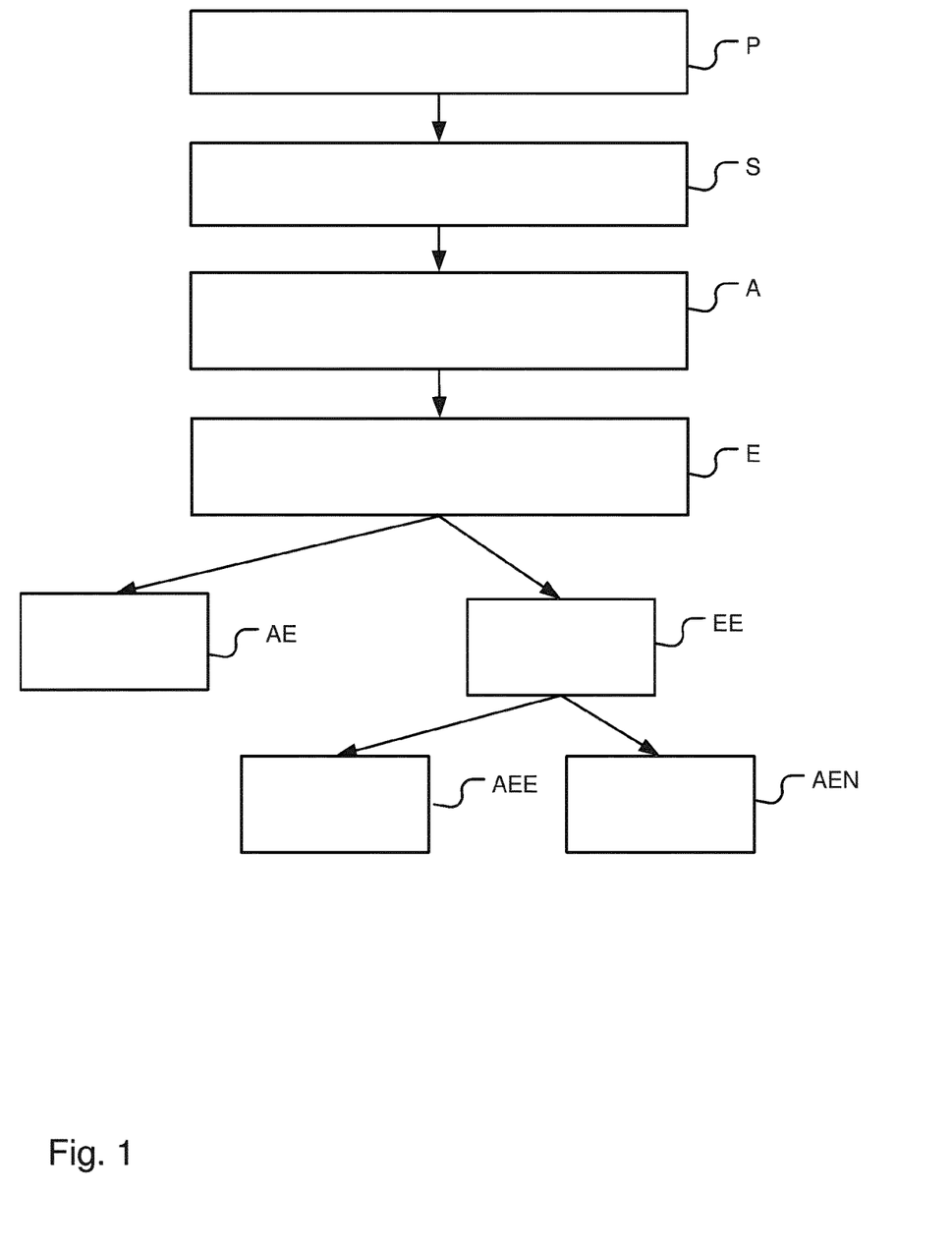
FIG. 1 shows schematically a method for assisting a power-intensive driving maneuver.

FIG. 1 shows the progression of a method according to the invention for assisting a power-intensive driving maneuver, taking by way of example an overtaking procedure of an ego vehicle propelled by an electric motor fed from an energy-storage device.

In the first step, which is denoted by P, an overtaking procedure of the ego vehicle 1 is predicted, for instance by virtue of the spacing from the vehicle traveling ahead being reduced and by simultaneous acceleration of the ego vehicle. In the second step, which is denoted by S, a peak-power profile that is needed for the complete execution of the predicted overtaking procedure is ascertained. For this purpose, the temporal progression of the maximum propulsive power needed for the overtaking procedure, for instance, is ascertained. In the third step, which is denoted by A, the available propulsive power of the ego vehicle is then determined. The propulsive power in this case is composed at least of the power of the electric motor and the power of the energy-storage device. In the fourth step, which is denoted by E, it is ascertained whether the available propulsive power is sufficient for the peak-power profile. Depending upon whether or not the available propulsive power is sufficient for the peak-power profile, one of the following actions is carried out: action a), if the available propulsive power is sufficient for the peak-power profile; action b), if the available propulsive power is not sufficient for the peak-power profile. Action a) is denoted in FIG. 1 by AE and stands for the indicating of a symbol in the display of the ego vehicle, said symbol drawing attention to a recommendation for execution of the overtaking procedure. Action b) is denoted in FIG. 1 by EE and stands for the ascertaining of whether the available propulsive power is sufficient for a restricted peak-power profile that is needed for an overtaking procedure with reduced acceleration and reduced maximum speed. Depending upon the outcome of the ascertainment procedure, various symbols are indicated in the display of the ego vehicle. If it is ascertained that the available propulsive power is sufficient for the restricted peak-power profile, a symbol is indicated that draws attention to the recommendation for execution of the overtaking procedure with reduced acceleration and reduced maximum speed; this procedure is denoted in FIG. 1 by AEE. If it is ascertained that the available propulsive power is not sufficient for the restricted peak-power profile, a symbol is indicated that draws attention to the recommendation for non-execution of the overtaking procedure: neither of the originally predicted overtaking procedure nor of the subsequently ascertained overtaking procedure with reduced acceleration and reduced maximum speed; this procedure is denoted in FIG. 1 by AEE.

Figure 2:
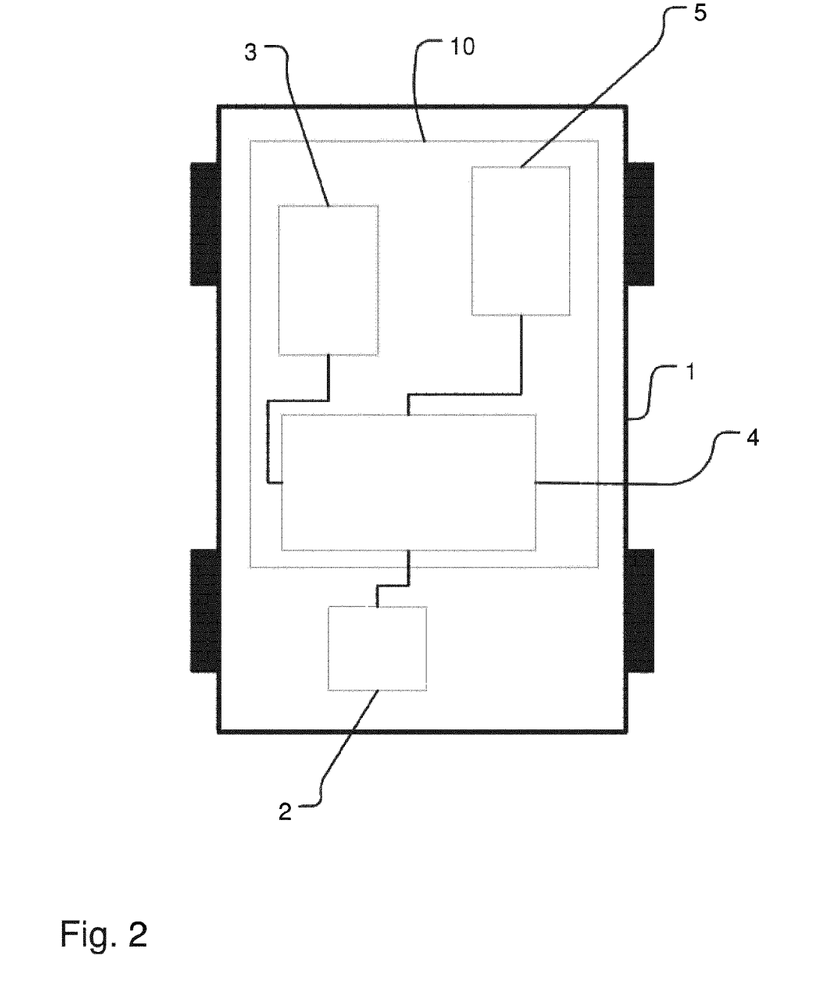
FIG. 2 shows schematically an assistance system for a power-intensive driving maneuver.

Shown schematically in FIG. 2 is an assistance system for a power-intensive driving maneuver, which will be elucidated by taking an overtaking procedure as an example. FIG. 2 shows the assistance system 10 as part of an ego vehicle 1, the ego vehicle not being a constituent part of the assistance system. The ego vehicle 1 exhibits an energy-storage device 2 and an electric motor (not illustrated) fed from said device. The electric motor propels the ego vehicle 1.

The assistance system 10 exhibits a detection unit 3 for predicting an overtaking procedure of the ego vehicle 1. The detection unit 3 is designed to detect, evaluate and provide environmental data, pedal parameters and steering parameters pertaining to the ego vehicle 1. If, for instance, it is detected by the detection unit 3 that the accelerator pedal of the ego vehicle 1 swiftly depressed within a predetermined time—that is to say, if the complete pedal travel is utilized within a very short time—and if at the same time it is recognized via the environmental data that the spacing from a vehicle traveling ahead is being reduced, the detection unit 3 predicts an overtaking procedure.

The assistance system 10 further exhibits a control unit 4 coupled with the detection unit 3 and with the energy-storage device 2. If an overtaking procedure is predicted by the detection unit 3, a corresponding item of information is forwarded to the control unit 4. The control unit 4 thereupon ascertains a peak-power profile that is needed for the complete execution of the overtaking procedure. For this purpose, a planning of the trajectory for the overtaking procedure is firstly carried out with the aid of the captured environmental data, in order to ascertain therefrom the period for the complete execution of the overtaking procedure. Thereupon it is ascertained at what instant and for what period during the overtaking procedure the maximum propulsive power is needed in order to execute the predicted overtaking procedure. In other words, it is calculated when and for how long the electric propulsion system has to be operated under peak load or under continuous load during the overtaking procedure in order to fill out the overtaking procedure completely.

In addition, the control unit 4 determines the available propulsive power of the ego vehicle 1 and ascertains whether the available propulsive power is sufficient for the previously determined peak-power profile. In other words, the control unit 4 checks whether the available propulsive power is sufficient in order to operate the electric propulsion system under peak load or continuous load for the respective defined time-intervals.

Furthermore, the assistance system 10 exhibits an instrument display 5 which is designed to indicate highly diverse information such as, for instance, speed, engine speed, gasoline-level, transmission gear, engine-oil temperature, speed-limit information, navigation hints, communication data and/or the current fuel consumption. In this regard, the indication may be effected visually, audibly and/or haptically.

If it is established that the available propulsive power is sufficient for the peak-power profile, the control unit 4 transmits this information to the instrument display 5.

If the available propulsive power is not sufficient for the peak-power profile, the control unit 4 ascertains whether the available propulsive power is sufficient for an overtaking procedure with restricted power—that is to say, for instance, with reduced maximum speed and/or with reduced maximum engine speed and/or with reduced maximum acceleration. In other words, the control unit 4 executes a new planning of a trajectory, possibly incorporating the current—at this instant—environmental data and/or pedal parameters and/or steering parameters, and determines a peak-power profile for this updated trajectory planning.

If it is established that the available propulsive power for the restricted peak-power profile is sufficient for the overtaking procedure with restricted power, the control unit 4 transmits this information to the instrument display 5.

If it is established that the available propulsive power is also not sufficient for the restricted peak-power profile, the control unit 4 transmits this information to the instrument display 5.

Figure 3:
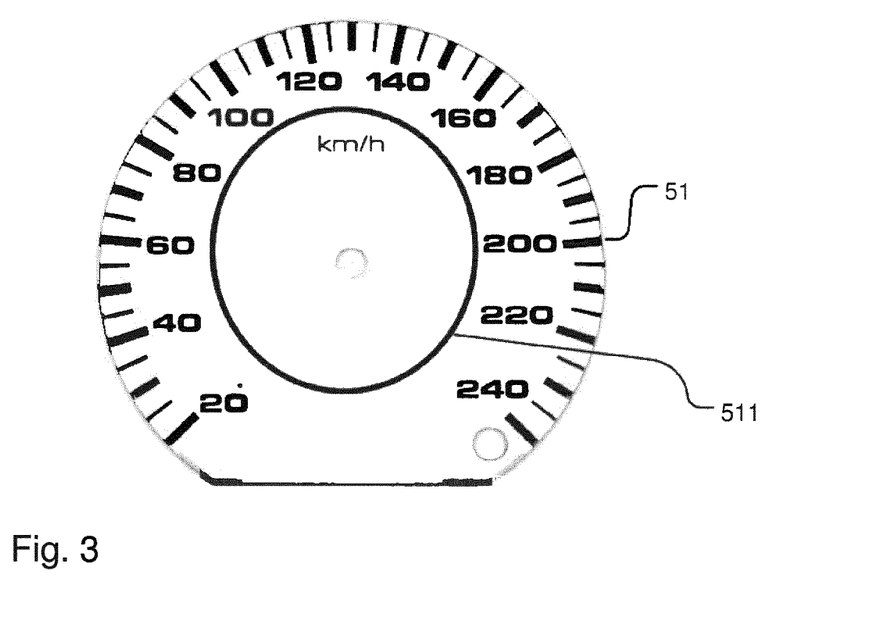
FIG. 3 shows, by way of example, an indication of a recommendation for execution of the predicted driving maneuver.
Figure 4:
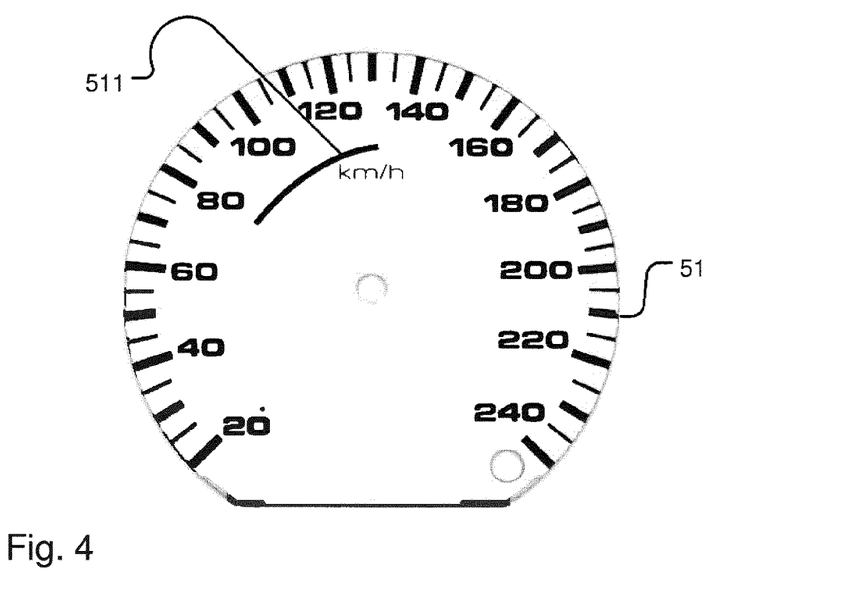
FIG. 4 shows, by way of example, an indication of a recommendation for restricted execution of the predicted driving maneuver.
Figure 5:
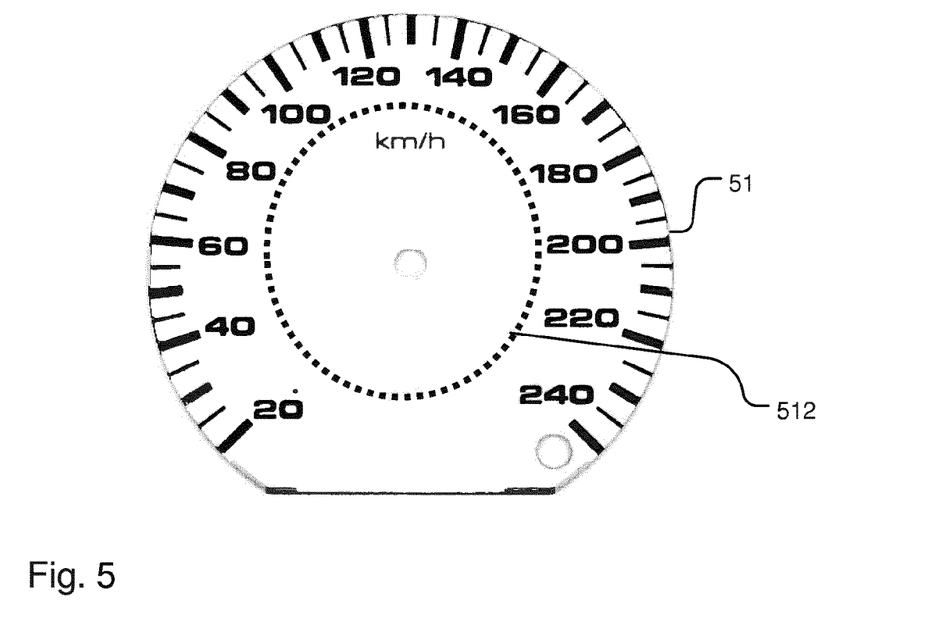
FIG. 5 shows, by way of example, an indication of a recommendation for non-execution of the predicted driving maneuver.

FIGS. 3-5 show, by way of examples, indications of a recommendation for (restricted) execution or for non-execution of the predicted driving maneuver, which are brought about by the transmission of the respective information to the instrument display 5.

FIG. 3 shows a speedometer 51 which is part of the instrument display 5. Along the speed indication represented in a circle there extends a luminous band 511 in the form of a circle. Advantageously, the luminous band 511 glows in green. Accordingly, if the luminous band 511 represented as a circle is indicated on the speedometer 51, a recommendation for execution of the predicted driving maneuver is thereby made known. In other words, the information that the planned overtaking procedure can be executed without restrictions, or, to be more exact, that the available propulsive power or available maximum propulsive power for the peak-power profile is sufficient for the predicted overtaking procedure, is represented visually. For instance, the indication of the luminous band 511 according to FIG. 3 can make it clear visually that the planned overtaking procedure can be executed without restrictions—that is to say, at the current speed at this instant.

FIG. 4 shows the visual representation of the information that the planned overtaking procedure can be executed only in restricted manner or, to be more exact, that the available propulsive power is sufficient only for the restricted peak-power profile. In order to make this known, along the speed indication represented in the speedometer 51 in the form of a circle there extends a luminous band 511 which advantageously glows in green. Within the speed-range marked in green (luminous band 511, range of 80-130 km/h) the available propulsive power or available maximum propulsive power is sufficient for a restricted overtaking procedure. For a speed that is higher than the speed-range marked in green (luminous band 511), only a reduced propulsive power would be available, which is reflected, for instance, in a reduced acceleration capacity or in a lower maximum speed. By virtue of the indication of the various ranges, the driver is informed of the range within which the overtaking procedure is recommended, and of the range within which overtaking is advised against. The driver is accordingly able to accelerate further, also outside the speed-range marked in green, but it is made clear by the indication of the green range that a power restriction is to be reckoned with outside this range.

FIG. 5 shows the visual representation of the information that the available propulsive power is not sufficient for the restricted peak-power profile, and therefore a recommendation cannot be output for execution either of the predicted overtaking procedure or of the restricted overtaking procedure. By virtue of the circular luminous band 512, which advantageously glows in red, it is signaled that there is no speed-range within which the overtaking procedure can be carried out safely and within an appropriate time.

Figure 6:
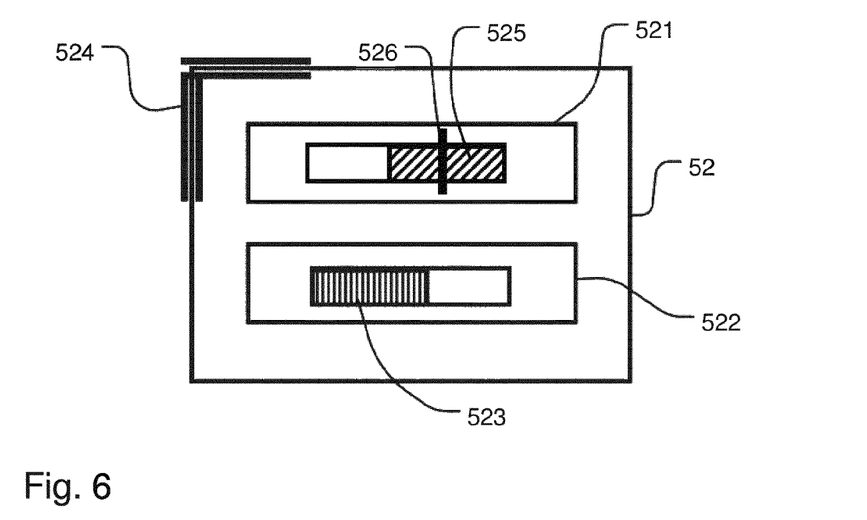
FIG. 6 shows, by way of example, an indication of a recommendation for restricted execution of the predicted driving maneuver.

FIG. 6 shows an alternative visual representation of the information that the available propulsive power is sufficient for the restricted peak-power profile. For this purpose, an indication element 52 has been integrated within the instrument display 5. The indication element 52 exhibits a pedal-parameter indication 521, an overtaking-duration indication 522 and a validity indication 524. The pedal-parameter indication 521 includes a pedal-travel-range indication 525, which indicates a range of the pedal travel within which a restricted execution of the predicted overtaking procedure is possible, and a pedal-travel indicator 526 which indicates the current pedal travel. This accordingly means that the pedal-parameter indication 521 provides information as to whether acceleration can or has to be effected more intensely or more feebly in order to execute the predicted overtaking procedure in restricted manner. Furthermore, the pedal-parameter indication 521 provides information as to whether the current pedal travel—that is to say, the current acceleration—is within a range in which a restricted execution of the predicted overtaking procedure is possible. The overtaking-duration indication 522 represents the foreseeable duration of the overtaking procedure, which is forecast on the basis of the predicted driving maneuver. For this purpose, the overtaking-duration indication 522 exhibits a time-bar 523 which specifies the forecast, still remaining duration of the overtaking procedure. The validity indication 524 specifies the period of time for which the recommendation for restricted execution of the overtaking procedure remains valid. This is advantageously visualized by a time-bar becoming smaller, as represented in FIG. 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for assisting a power-intensive driving maneuver of an ego vehicle propelled by an electric motor fed from an energy-storage device, the method comprising:
   predicting a power-intensive driving maneuver of the ego vehicle;
   ascertaining a peak-power profile that is needed for a complete execution of the predicted driving maneuver;
   determining an available propulsive power of the ego vehicle;
   ascertaining whether the available propulsive power is sufficient for the peak-power profile, and
   wherein if the available propulsive power is sufficient for the peak-power profile the method further comprises indicating a recommendation for execution of the predicted driving maneuver,
   wherein if the available power is not sufficient for the peak-power profile, the method further comprises:
      ascertaining whether the available propulsive power is sufficient for a restricted peak-power profile that is needed for a restricted execution of the predicted driving maneuver,
      indicating a recommendation for restricted execution of the predicted driving maneuver if the available propulsive power is sufficient for the restricted peak-power profile, and
      indicating a recommendation for non-execution of the predicted driving maneuver if the available propulsive power is not sufficient for the restricted peak-power profile.

2. The method according to claim 1, wherein ascertaining the peak-power profile comprises:
   ascertaining a duration of the predicted driving maneuver; and
   ascertaining a temporal progression of the available propulsive power over a predicted period.

3. The method according to claim 1, wherein the available propulsive power includes at least the electrical power of the energy-storage device and the power of the electric motor.

4. The method according to claim 2, wherein the available propulsive power includes at least the electrical power of the energy-storage device and the power of the electric motor.

5. The method according to claim 3, wherein determining an available propulsive power comprises at least one of the following:
   ascertaining a state of charge of the energy-storage device,
   ascertaining a thermal state of the energy-storage device,
   ascertaining a power-consumption history over a certain time-interval, and
   ascertaining an operating limit of the electric motor.

6. The method according to claim 4, wherein determining an available propulsive power comprises at least one of the following:
ascertaining a state of charge of the energy-storage device,
ascertaining a thermal state of the energy-storage device,
ascertaining a power-consumption history over a certain time-interval, and
ascertaining an operating limit of the electric motor.

7. The method according to claim 1, wherein determining the available propulsive power comprises determining the available propulsive power for the complete execution of the predicted driving maneuver and determining the available propulsive power after the complete execution of the predicted driving maneuver.

8. The method according to claim 1, wherein indicating the recommendation for restricted execution of the predicted driving maneuver comprises indicating a forecast temporal progression of the available propulsive power.

9. An assistance system for a power-intensive driving maneuver of an ego vehicle propelled by an electric motor fed from an energy-storage device, the assistance system comprising:
a detection unit configured to predict a power-intensive driving maneuver of the ego vehicle;
a control unit coupled with the detection unit and with the energy-storage device; and
an indicating device coupled with the control unit,
wherein the control unit is configured to:
ascertain a peak-power profile that is needed for a complete execution of the predicted driving maneuver,
determine an available propulsive power of the ego vehicle, and
ascertain whether the available propulsive power is sufficient for the peak-power profile,
wherein if the available propulsive power is not sufficient for the peak-power profile, the control unit is further configured to ascertain whether the available propulsive power is sufficient for a restricted peak-power profile that is needed for a restricted execution of the predicted driving maneuver,
wherein the indicating device is configured to indicate a recommendation for execution of the predicted driving maneuver if the available propulsive power is sufficient for the peak-power profile,
wherein the indicating device is configured to indicate a recommendation for a restricted execution of the predicted driving maneuver if the available propulsive power is sufficient for the restricted peak-power profile, or to indicate a recommendation for non-execution of the predicted driving maneuver if the available propulsive power is not sufficient for the restricted peak-power profile.

10. The assistance system according to claim 9, wherein the control unit is configured to ascertain the peak-power profile by:

ascertaining a duration of the predicted driving maneuver; and
ascertaining a temporal progression of the available propulsive power over a predicted period.

11. The assistance system according to claim 9, wherein the available propulsive power includes at least the electrical power of the energy-storage device and the power of the electric motor.

12. The assistance system according to claim 10, wherein the available propulsive power includes at least the electrical power of the energy-storage device and the power of the electric motor.

13. The assistance system according to claim 11, wherein the control unit is configured to determine the available propulsive power by:
ascertaining a state of charge of the energy-storage device,
ascertaining a thermal state of the energy-storage device,
ascertaining a power-consumption history over a certain time-interval, and/or
ascertaining an operating limit of the electric motor.

14. The assistance system according to claim 12, wherein the control unit is configured to determine the available propulsive power by:
ascertaining a state of charge of the energy-storage device,
ascertaining a thermal state of the energy-storage device,
ascertaining a power-consumption history over a certain time-interval, and/or
ascertaining an operating limit of the electric motor.

15. The assistance system according to claim 9, wherein the control unit is configured to determine the available propulsive power by determining the available propulsive power for the complete execution of the predicted driving maneuver and the determining the available propulsive power after complete execution of the predicted driving maneuver.

16. The assistance system according to claim 10, wherein the control unit is configured to determine the available propulsive power by determining the available propulsive power for the complete execution of the predicted driving maneuver and the determining the available propulsive power after complete execution of the predicted driving maneuver.

17. The assistance system according to claim 11, wherein the control unit is configured to determine the available propulsive power by determining the available propulsive power for the complete execution of the predicted driving maneuver and the determining the available propulsive power after complete execution of the predicted driving maneuver.

18. The assistance system according to claim 9, wherein the indication device is configured to indicate the recommendation for restricted execution of the predicted driving maneuver by indicating of a forecast temporal progression of the available propulsive power.

19. A vehicle comprising the assistance system according to claim 9.

* * * * *